United States Patent
Petzold

(10) Patent No.: US 10,151,461 B2
(45) Date of Patent: Dec. 11, 2018

(54) LIGHTING DEVICE AND LIGHTING ASSEMBLY

(71) Applicant: Apure Holding LLC, Miami, FL (US)

(72) Inventor: Ulrich H. Petzold, Miami Beach, FL (US)

(73) Assignee: Apure Holding LLC, Miami, FL (US)

( * ) Notice: Subject to any disclaimer, the term of this patent is extended or adjusted under 35 U.S.C. 154(b) by 84 days.

(21) Appl. No.: 15/425,849

(22) Filed: Feb. 6, 2017

(65) Prior Publication Data
US 2018/0224096 A1 Aug. 9, 2018

(51) Int. Cl.
| F21S 8/00 | (2006.01) |
| F21V 21/04 | (2006.01) |
| F21S 8/02 | (2006.01) |
| F21V 5/04 | (2006.01) |
| G02B 5/00 | (2006.01) |
| G02B 1/11 | (2015.01) |
| F21V 17/06 | (2006.01) |
| F21V 29/76 | (2015.01) |

(52) U.S. Cl.
CPC .............. *F21V 21/04* (2013.01); *F21S 8/024* (2013.01); *F21S 8/026* (2013.01); *F21V 5/04* (2013.01); *F21V 17/06* (2013.01); *F21V 29/763* (2015.01); *G02B 1/11* (2013.01); *G02B 5/003* (2013.01)

(58) Field of Classification Search
CPC .......... F21V 21/04; F21V 29/763; F21V 5/04; F21V 17/06; F21S 8/024; F21S 8/026; G02B 1/11; G02B 5/003
See application file for complete search history.

(56) References Cited

U.S. PATENT DOCUMENTS

| 6,350,043 B1* | 2/2002 | Gloisten | B64D 11/00 362/287 |
| 8,568,008 B2* | 10/2013 | Yoshida | B60Q 3/76 362/311.02 |
| 2007/0008729 A1* | 1/2007 | Tarpo | F21S 8/02 362/351 |
| 2008/0285271 A1* | 11/2008 | Roberge | F21S 8/033 362/235 |
| 2011/0141728 A1* | 6/2011 | Russello | F21V 3/00 362/235 |
| 2012/0106138 A1* | 5/2012 | Mandy | B66B 11/0233 362/147 |

FOREIGN PATENT DOCUMENTS

| DE | 102016007844 A1 * | 12/2017 | ............. F21S 8/026 |
| EP | 2031296 A1 * | 3/2009 | ................ F21S 8/02 |

* cited by examiner

*Primary Examiner* — Mary Ellen Bowman
(74) *Attorney, Agent, or Firm* — Socal IP Law Group LLP; Nikki M. Dossman; Steven C. Sereboff

(57) ABSTRACT

A lighting device is disclosed, in particular for installation behind a flat wall or ceiling element. Further provided is a lighting assembly wherein the wall or ceiling element comprises a first light passage opening, and the lighting device is arranged on a rear side of the wall or ceiling element such that the focal point is located in the first light passage opening and/or in the plane of a front side of the wall or ceiling element opposite the rear side, whereby the lighting device contacts the rear side of the wall or ceiling element in particular flatly.

16 Claims, 24 Drawing Sheets

LIGHTING DEVICE AND LIGHTING ASSEMBLY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a lighting device comprising a first light passage opening, in particular for installation behind a planar wall or ceiling element.

Description of the Related Art

Lighting devices with a wall or ceiling cover panel and a lens arrangement that focuses light emitted from an light source onto a focal point in front of the lens arrangement, whereby the light expands into a light cone behind the focal point, are known in the prior art, for example from EP 2 031 296 A1. It is intended for the wall or ceiling cover panel to have a light passage opening, wherein the light source and the lens arrangement are positioned in such a way that the focal point lies within the area of the opening and the light cone expands onto the side of the wall or ceiling element that is facing the room that shall be illuminated. Lighting devices of this sort are advantageous in that they can be positioned behind a wall or ceiling cover panel which hides them from sight. The required diameter of the light passage opening is significantly smaller than the diameter of the light source or the lens arrangement, so that the appearance of the wall or ceiling cover panel is influenced to a lesser degree. Furthermore, an indirect light that dazzles less is made possible.

However, lighting devices of this type are usually quite large with regards to their dimensional installation height, which in turn requires large spaces between the cover panel and the wall or ceiling.

BRIEF DESCRIPTION OF THE DRAWINGS

FIG. 6a to FIG. 6e show various embodiments of a lighting assembly with a second embodiment of a lighting device.

DETAILED DESCRIPTION

Figure 1:
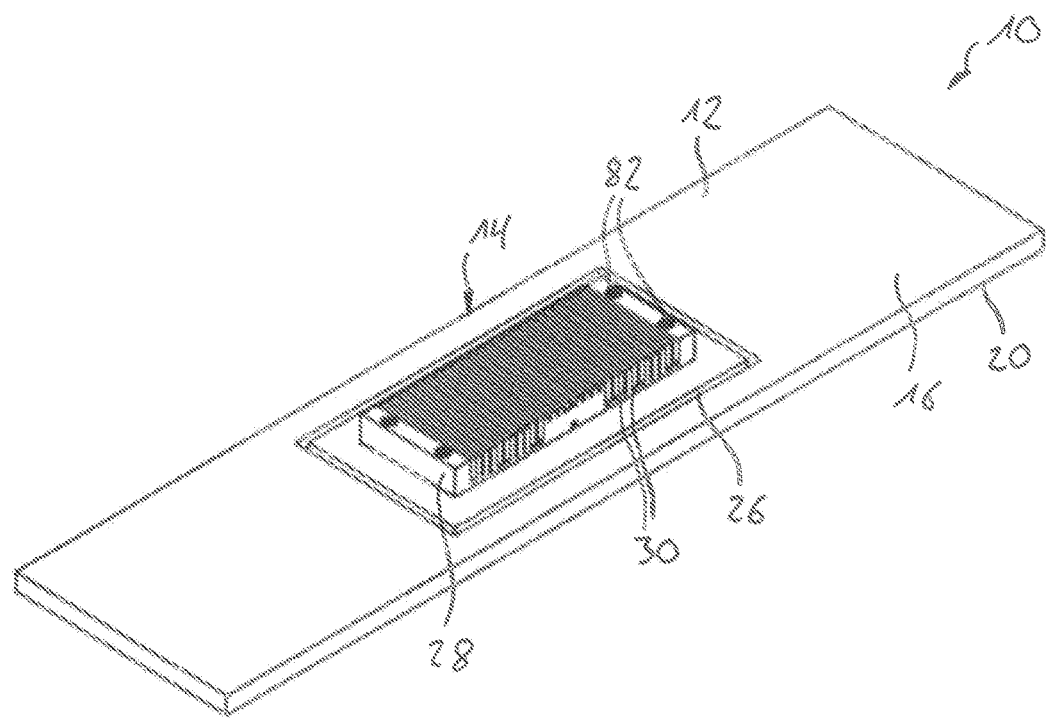
FIG. 1 shows a perspective rear view of a lighting assembly with a lighting device.

A lighting device is disclosed that has a decreased installation height and is easily installed. A lighting assembly includes the lighting a device and planar, flat wall or ceiling element that requires less space between the cover panel and the wall or ceiling.

This purpose is fulfilled by a lighting device, in particular for installation behind a flat wall or ceiling element, which comprises a first light passage opening. The lighting device has a housing, a light source arranged in the housing and a lens arrangement arranged in the housing, the lens arrangement comprising a light entry side facing the light source and a light exit side facing away from the light source, and which focusses the light emitted from the light source, in a longitudinal direction extending from the light entry side to the light exit side, to a light cone, whose focal point lies in the longitudinal direction behind the light exit side of the lens arrangement. The housing comprises an accommodation space for the light source and the lens arrangement, whereby the accommodation space comprises an accommodation opening as well as an installation surface for the light source situated in front of the accommodation opening in the longitudinal direction. Furthermore, a holding device with a second light passage opening is provided, whereby the holding device supports and/or carries the lens arrangement, and whereby the holding device extends over the entire accommodation opening. The holding device positions and/or fixes the lens arrangement relative to the light source in such a way that the focal point lies behind the light exit side of the lens arrangement in the longitudinal direction.

The light source is held on the installation surface, e.g. it can be arranged on a circuit board that may also comprise controls for the light source as well as a connection for a power supply. The lens arrangement is inserted into the accommodation space in opposition to the longitudinal direction R and is held and positioned in the accommodation space relative to the light source by a subsequently installed holding device, so that the position of the focal point of the lens arrangement is fixed. For example, the lens arrangement is clamped in between the installation surface and/or the light source and the holding device. The holding device encloses the accommodation area with the exception of the recess, so that the infiltration of dust, splash water or dirt into the accommodation area is prevented.

The lighting device presents a compact, closed unit, which may be installed on the rear side of a wall or ceiling element. Since the light source and the lens arrangements are situated in the accommodation space, the lighting device has a very low height. Since the lens arrangement furthermore is held by the holding device, said holding device enclosing the accommodation space, a simpler construction of the lighting device is possible.

For example, the holding device is screwed onto the housing or reversibly fixable to the housing in another manner, so that the holding device may be removed, for example for exchanging the light source. The securing means are preferably sunk into the holding device and the housing, so that these do not protrude over the surface of the housing.

The lens arrangement comprises for example a reflector, which focusses the light to a light cone. The lens arrangement can however also comprise one or more lenses, which effect focussing of the light.

The holding device may comprise a receptacle for the light exit side of the lens arrangement with a contact surface facing in opposite direction to the longitudinal direction R for the lens arrangement, wherein the lens arrangement has especially at least one projection and/or a peripheral edge which rests against the contact surface. The lens arrangement projects in the longitudinal direction into the holding device and is thus securely fixed or positioned. As a result, simple fixing or positioning is possible without additional holding means so that a rapid assembly and disassembly of the lens arrangement and/or of the light source can take place.

For example, at least one elevation or a protrusion for supporting the holding device is provided at one edge of the accommodation space, so that the holding device is flush with the surface of the housing and does not project beyond it. Thus, the lighting device has an even surface facing the wall or ceiling element which simplifies assembly on the wall or ceiling element. Furthermore, the positioning of the holding device can be determined by the shape of the protrusion or elevation.

The holding device can have at least one distancing element which defines the distance between the light source and the holding device as well as the lens arrangement positioned and/or fixed on the holding device. The position of the focal point, in particular the distance of the focal point from the light exit side of the lens arrangement, can be adjusted by varying the distance between the holding device and the lens arrangement relative to the light source. In particular, the distance of the holding device from the light source can also be adjusted to different lens arrangements with a different length. As an example, the lens arrangement can also be supported by or borne on the distance element and/or the thickness of the holding device can be set such that it is flush with the surface of the housing.

As an example, in the longitudinal direction in front of the lens arrangement, an anti-glare device with a light exit channel extending in the longitudinal direction is provided. The light exit channel may be designed in such a way, that reflections of the light are prevented so that the light emerging from the lighting device forms a defined light cone. The surface of the light guide channel may be black in order to avoid reflections. Since the light source sits very deeply in the lighting device, glare by the light source is prevented. The glare shield or anti-glare device may be designed in such a way that the latter does not project into the light cone emanating from the lens arrangement, but rather merely prevents scattered light. The inner cross-section of the anti-glare device may have the shape of the lens arrangement or the light cone. In particular, the inner cross-section has a circular shape. Furthermore, the anti-glare device can protrude into the first light passage opening of the wall or cover element, enabling positioning the lighting device.

The external cross-section of the anti-glare device can be adapted to the shape of the first light opening, for example circular or square. The anti-glare device can have an anti-anti-glare frame arranged in the longitudinal direction behind the lens arrangement and held on the holding device. The anti-anti-glare frame is a separate component, which projects in the wall or ceiling element and is able to position for example the lighting device on the wall or ceiling element. Furthermore, the anti-glare device may comprise a support element which is part of the holding device and in which the second light opening is provided, wherein the lens assembly is supported by and/or based on the support element. The support element can be provided instead of an anti-glare device or in addition to an anti-glare device and forms part of the holding device which can protrude from the receiving space. In particular reflections can be avoided easily, since the support element directly adjoins the lens arrangement. The support element may, for example, be preassembled on the lens arrangement in order to simplify the assembly of the lighting device. For example, the lens arrangement and the support element are locked together.

The holding device has, for example, a holding plate, which is fastened to the housing and has a recess, on which the support element is held or fixed. This arrangement permits simple positioning and/or fixing of the support element and thus of the lens arrangement held on the support element. The holding plate and the support element may be separate components. However, it is also possible for the holding plate and the support element to be embodied in one piece.

The support element can have at least one section with a constant cross-section adjoining the light passage opening in the longitudinal direction as well as a section with tapering cross-section, which adjoins the section with constant cross-section on the side facing away from the lens arrangement. The support element is preferably matched to the shape of the light cone. Preferably, the tapering section or a section with smaller cross section adjoining this section protrudes into the wall or ceiling element, so the first light passage opening may comprise a smaller cross-section.

The focal point is preferably in the light exit channel, in particular arranged in the plane of the rear end of the glare shield in the longitudinal direction R. In an installed condition, the focal point is situated thereby in the wall or ceiling element, in particular in the plane of the front side facing the inner space. The light cone has therefore a very small cross section within the first light passage opening, so that the first light passage opening may comprise a very small cross section. In the longitudinal direction behind the wall or ceiling element, the light broadens to a second light cone, so that decent, glare free lighting results.

In the light exit channel at least one optical element may be provided. The optical element may be for example an aperture or a lamella, which partly screen the light in order to prevent glare, a transparent or semi-transparent element, which prevents penetration of dirt or dust into the lighting device, or a light-dispersing element.

The housing is preferably a cooling body, which in particular comprises cooling fins on the side opposite the accommodation space. Modern light sources produce heat and require therefore cooling. Since the housing is formed as a cooling body, no additional cooling elements attached to the outer side are required, through which the height of the lighting device may be further reduced. In order to increase the cooling performance of the housing, the housing comprises cooling fins on in particular the side opposite the accommodation space.

On the side of the housing comprising the accommodation opening, at least one spacing element protruding in the longitudinal direction R, in particular a spacing plate, may be provided. When installed on the rear side of a wall or ceiling element, the lighting device may be positioned such that the focal point is located in the first light passage opening, or rather in the plane of the front side of the wall or ceiling element. Should the wall or ceiling element have such a small thickness that the focal point would be located in the longitudinal direction R behind the front side of the wall or ceiling element, the position of the lighting device may be adjusted through one or more such spacing elements such that the focal point is located in the first light passage opening or rather in the plane of the front side of the wall or ceiling element. In particular, a spacing element with a suitable thickness may be used. It is however also possible that several spacing elements are used, which each comprise the same thickness or different thicknesses.

A lighting assembly with a previously described lighting device and a flat or planar wall or ceiling element is furthermore provided, whereby the wall or ceiling element comprises a first light passage opening, and the lighting device is arranged such on a rear side of the wall or ceiling element that the focal point is located in the first light passage opening and/or in the plane of a front side opposite the rear side of the wall or ceiling element, whereby the lighting device lies in particular flat on the rear side of the wall or ceiling element. The lighting device is therefore arranged on the wall or ceiling element such that the light cone broadening in longitudinal direction L behind the focal point is not limited by the edge of the light passage opening, but rather the light cone broadens only after the light passage opening.

The lighting device may have a support element or an anti-glare frame, flush with the front side of the wall or ceiling element. The light passage opening may comprise a light-permeable cover, which in such an embodiment is flush with the wall or ceiling element. Through this, the penetration of dirt, water splashes and dust into the second light passage opening is prevented. Furthermore, a continuous surface of the wall or ceiling element is formed, which leads to a uniform appearance and can make cleaning of the wall or ceiling element easier.

The anti-glare device, in particular the support element or the anti-glare frame, preferably contacts the walling of the light passage opening and closes thereby the light passage opening completely.

The shape of the first light passage opening, in particular the cross-section of the first light passage opening, may be matched to the shape or rather the cross section of the support element and/or the anti-glare frame such that they lie flat on the inner circumference of the first light passage opening and close the light passage opening.

At least one spacing element, in particular a spacing plate, may be provided between the housing and the wall or ceiling element, whereby the thickness of the spacing plate is chosen such that the focal point is located in the light passage opening.

The wall or ceiling element comprises preferably a weak zone, which surrounds the lighting device in a circumferential direction at least in sections and extends into the wall or ceiling element in particular from the rear side facing the lighting device. The wall or ceiling element can for example be a plasterboard, which is typically installed irreversibly. Subsequent repair or exchange of the light device is thereby only possible with considerably effort. In order to facilitate the extension or exchange of the lighting device, weak zones are provided on the wall or ceiling element, along which a segment of the wall or ceiling element on which the lighting device is secured may be broken out, without damaging the remaining wall or ceiling element. If the position of the weak zones is known, the weak zones may for example also be additionally weakened from the front side of the wall or ceiling element before the removal of the lighting device, in order to facilitate breaking out the necessary part. For example, the weak zones may be formed such that they can be extended up to the front side, for example with a cutting tool, so that an easy removal of the then separated segment is possible In FIG. 1 to FIG. 5 a lighting assembly with a flat wall or ceiling element 12 as well as a lighting device 14 is shown, which is arranged on the rear side 16 of the wall or ceiling element 12. The light emitted from the lighting device 14 exits through a first light passage opening 18 (see FIG. 3 and FIG. 4) on the front side 20 of the wall or ceiling element 12.

The wall or ceiling element 12 may be made for example from wood or another material suitable for the manufacture of especially decorative wall or ceiling panels. The wall or ceiling element 12 may however also be a plasterboard panel or a panel made from another material, which in particular are used for interior construction of a space, for example in dry wall.

Figure 4:
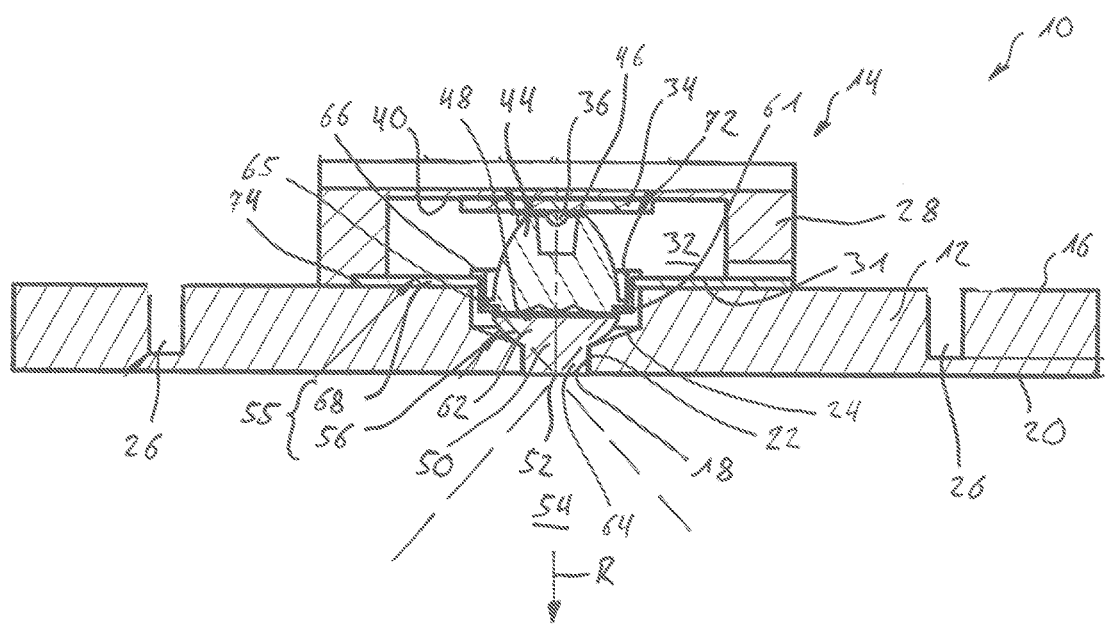
FIG. 4 shows a sectional side view of the lighting assembly of FIG. 1.
Figure 5:
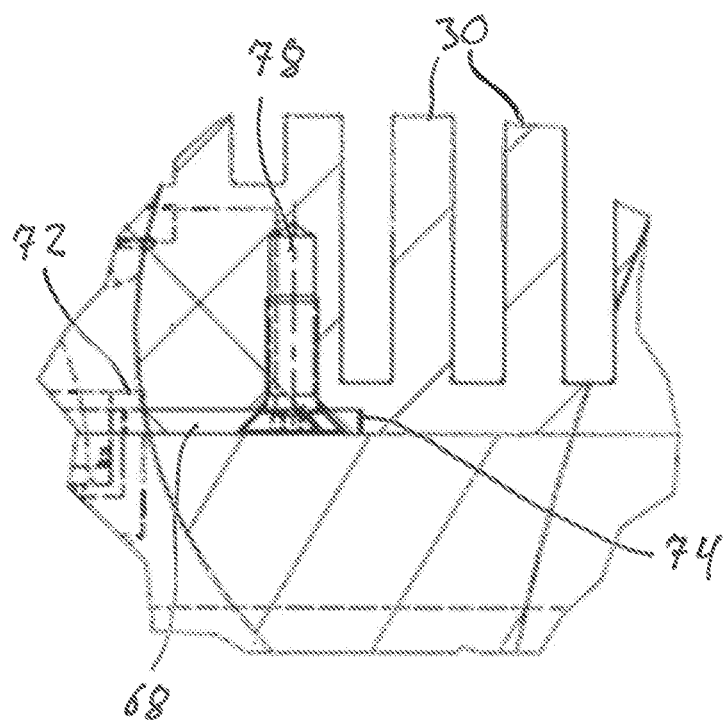
FIG. 5 shows a partial detailed view of the sectional view of FIG. 4.

As may be seen from FIG. 4, the first light passage opening 18 has a first region 22 facing the front side 20 with essentially constant cross section as well as a second region 24 joining the first region 22, in which the cross section away from the front side 20 increases, or rather tapers in longitudinal direction R towards the front side 20, and which merges into the first region 22.

Figure 2:
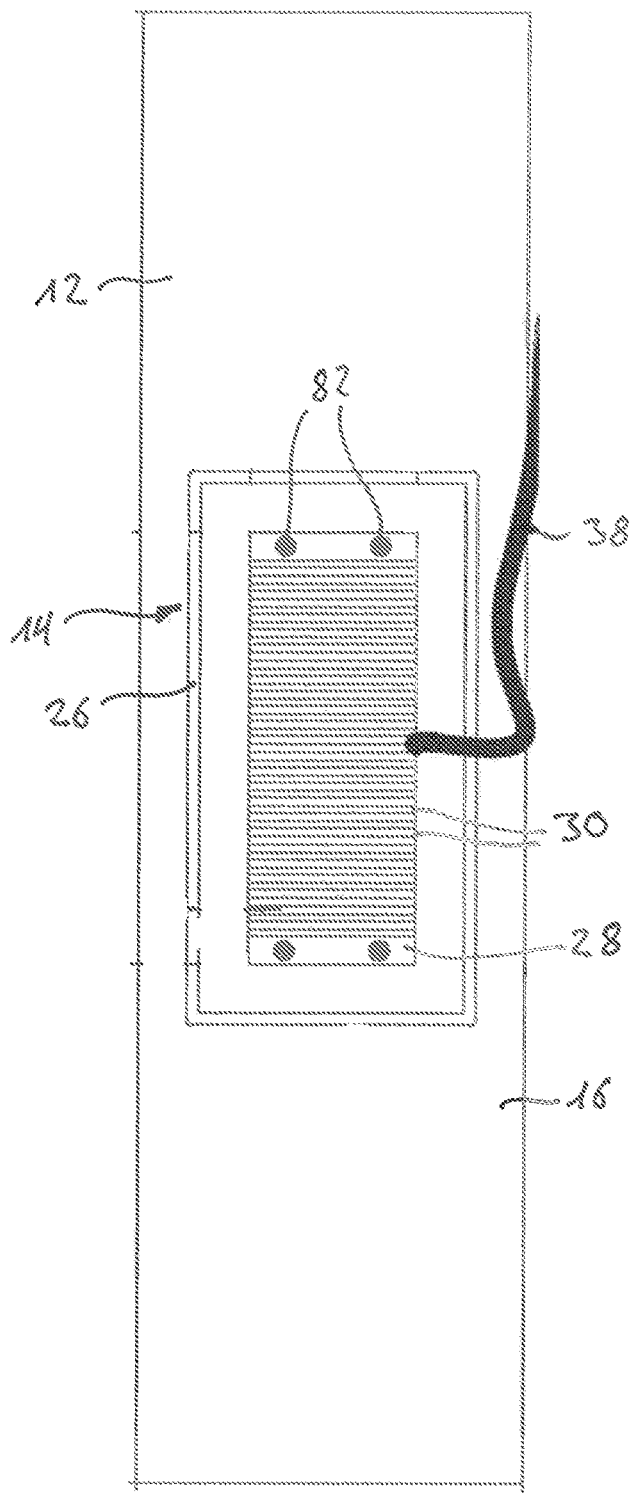
FIG. 2 shows a rear view of the lighting assembly of FIG. 1.
Figure 3:
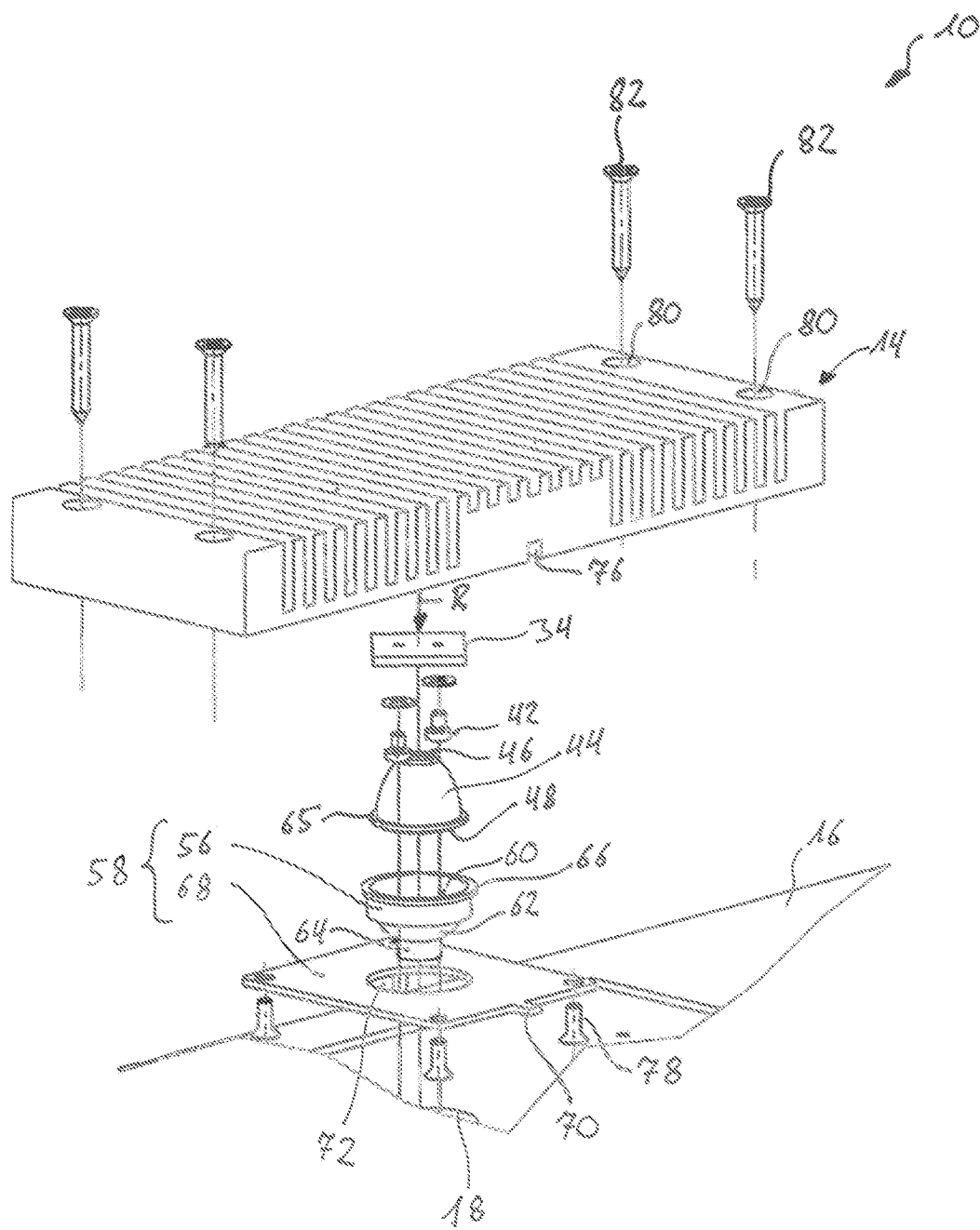
FIG. 3 shows an exploded view of the lighting assembly of FIG. 1.

Surrounding the lighting device 14 is a weak zone 26, to be seen in particular in FIG. 1, FIG. 2 and FIG. 4 and which is formed through a groove that extends from the rear side into the wall or ceiling element 12 and surrounds the lighting device 14. In the embodiment shown here, the weak zone 26 has a rectangular form when seen in plan view onto the wall or ceiling element 12. The weak zone 26 can however also comprise a different shape.

The lighting device 14 comprises a housing 28, which is formed as a cooling body, i.e., at least particular from a material which has good heat conducting properties. On the side of the housing 28 facing away from the wall or ceiling element 12, cooling fins 30 are provided, which improve the transmission of heat to the environment.

On the side opposite the cooling fins 30 and facing the wall or ceiling element 12, an accommodation space 32 is provided that extends from an accommodation opening 31 contrary to a longitudinal direction R into the housing 28 and is formed essentially as a cuboid. The floor of the accommodation space 32 is formed by an installation surface 40, which lies in the longitudinal direction R in front of the accommodation opening 31. The cooling fins 30 are shorter in the region of the accommodation space 32, whereby the cooling fins 30 generally comprises a uniform length in the region of the accommodation space 32 and outside of the region of the accommodation space 32 respectively.

In the accommodation space 32 a light source 36 is provided on a circuit board 34. On the circuit board 34, further control elements for the light source 36 as well as a connector for a voltage supply 38 may be provided. The circuit board 34 lies flat on the installation surface 40 and is secured with screws 42 to the installation surface 40 and/or adhered with it. The circuit board 34 is secured to the installation surface 40 in such a way that good heat transmission between the circuit board 34 and the housing 28 is guaranteed. For example, a heat-conducting paste is provided between the circuit board 34 and the installation surface 40.

In addition, a lens arrangement 44 is provided in the accommodation space 32, which with a light entry side 46 directly adjoins the light source 36, or rather on which side the light source 36 reaches into the lens arrangement 44, and has a light exit side 48 opposite the light entry side 46. A longitudinal axis of the lens arrangement 44 running perpendicular to the light entry side 46 and to the light exit side 48 extends in longitudinal direction R, whereby the light exit side 48 is arranged in the longitudinal direction R behind the light entry side 46.

The lens arrangement 44 is formed such that light emitted from the light source 36 in the longitudinal direction R focusses to a light cone 50, whose focal point 52 lies behind the light exit side 48 in the longitudinal direction R. Beyond the focal point 52 the light broadens to a second light cone 54 (see FIG. 4). The lens arrangement 44 can for example comprise a reflector and/or several lens. The lens arrangement may include a mechanism to position the circuit board 34 and/or the light source 36. For example, pins (not shown) may be provided on the lens arrangement 44 which reach into recesses on the circuit board.

A holding device 55 consisting of a support element 56 and a holding plate 68 joins to the lens arrangement 44. The support element 56 comprises a light passage opening 58, through which the light can shine out of the lens arrangement 44 onto the front side 20 of the wall or ceiling element 12. The support element 56 has an essentially cup-shaped accommodation 60 with a contact surface 61 facing contrary to the longitudinal direction R, in which the light exit side 48 of the lens arrangement 44 is accommodated, whereby the lens arrangement 44 contacts the contact surface 61 with a surrounding edge 65. For example, the lens arrangement 44 and the support element 56 may be engaged, such that these are fixed relative to one another, through which the construction of the lighting device 14 is simplified.

A section 62 is joined to the accommodation 60 in the longitudinal direction R, said section comprising a cross section that tapers away from the light exit side 48 of the lens arrangement 44 and merges into a second section 64 with a smaller, constant cross section. At the accommodation 60, a radially protruding collar 66 is provided, with which the support element 56 contacts the holding plate 68 in the longitudinal direction R on the edge of a recess 72. The recess 72 is formed circularly. The diameter of the recess 72 corresponds to the diameter of the cup-like accommodation 60 or is slightly larger than is and smaller than the outer diameter of the collar 66.

In the embodiment shown here, the holding plate 68 is formed as a rectangle and comprises besides the circular recess 72 two protrusions 70 provided on oppositely arranged edges.

The housing 28 comprises an elevation 74 on the edge of the accommodation space 32, in which the holding 68 is accommodation such that the side of the holding plate 68 facing away from the accommodation space 32 joins the front side in a flush manner. As shown in particular in FIG. 3, recesses 76 are provided on the edge of the accommodation space 32, into which the protrusions 70 extend. The holding plate 68 can hereby only be attached to the housing in a defined position. The holding plate 68 is fixed to the housing 68 with screws, whereby the screws 78 are sunk into the holding plate 68 as well as into the housing 28, so that these also do not protrude over the front side of the housing 28 (see FIG. 5).

As shown in particular in FIG. 4, the holding device 55 consisting of the holding plate 68 and the support element 56 fixes the lens arrangement 44 relative to the light source 36, or rather the circuit board 34 in the accommodation space 32. The support element 56 protrudes particular out of the accommodation space 32.

The accommodation space 32 is thereby enclosed through the holding device 55 consisting of the holding plate 68 and the support element 56, so that penetration of dust or dirt may be reliably prevented. Nevertheless, it is possible to open the accommodation space 32 in a simple manner through loosening of the screws 78, for example to extend the light source 36.

The lighting device 14 lies flat with the front side on the rear side 16 of the wall or ceiling element 12 and extends with the support element 56 into the first light passage opening 18, whereby the second section 64 protrudes into the first region 22 and lies flat on the walling of the first region 22 and the first section 62 is arranged in the second region 24 and contacts its walling. In the housing 28, bore holds 80 are provided, through which screws 82 extend into the rear side 16 of the wall or ceiling element, through which the lighting device 14 is fixed to the wall or ceiling element 12.

As may be seen in FIG. 4, the support element 56, in particular the second section 64, closes flush with the front side 20 of the wall or ceiling element 12. The focal point 52 is located in the second light passage opening 58 or rather in its rear end in the longitudinal direction R, and thereby is also located in the first light passage opening 18 or rather in the plane of the front side 20 of the wall or ceiling element 12. The light cone 50 exiting the lighting device 14 is thereby not influenced by the wall or ceiling element 12. Furthermore, the first light passage opening 18 and the second light passage opening 58 can be formed very small, in particular smaller than the diameter of the lens arrangement 44.

Since the cooling body is formed by the housing 28 and extends essentially laterally to the accommodation body 32, a particularly flat lighting device 14 is provided, which has a minimal installation height. Through the accommodation or rather fixing of all components in the accommodation space 32, a simple assembly is furthermore guaranteed. In particular, the support element 56 is matched to the thickness of the wall or ceiling element 12, so that the support element 56 does not protrude past the wall or ceiling element 12. The height is in total only insignificantly larger than the space required by the light source 36, the lens arrangement and the holding device 55.

As may be seen in FIG. 6a to FIG. 6e, the lighting device 14 can further be attached to the rear side 16 of wall or ceiling elements 12 of different thicknesses. The lighting device 14 shown in FIG. 6a to FIG. 6e corresponds in terms of its construction in principle to the lighting device 14 shown in the FIG. 1 to FIG. 5. The holding plate 68 and thereby the holding device 55 are only offset into the accommodation space 32 contrary to the longitudinal direction R, so that the holding plate 68 does not close flush with the front side of the housing 28.

Figure 6A:
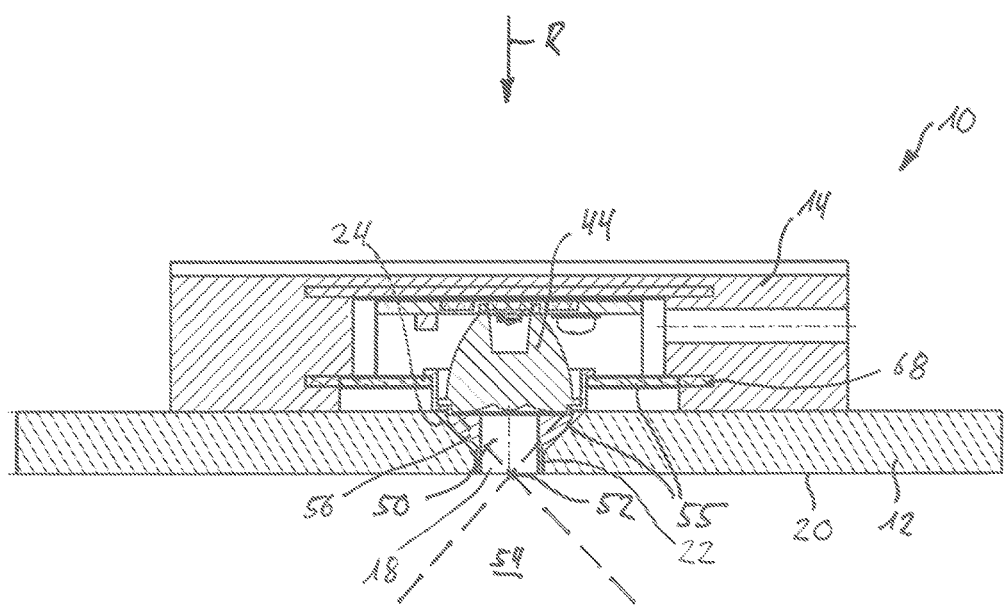

In FIG. 6a, the thickness of the wall or ceiling element 12 corresponds to the protrusion of the support element 56 over the holding plate 68 or rather over the front side of the housing 28. The housing 28 can thereby be laid flat on the rear side 16 of the wall or ceiling element and fixed thereto.

Figure 6B:
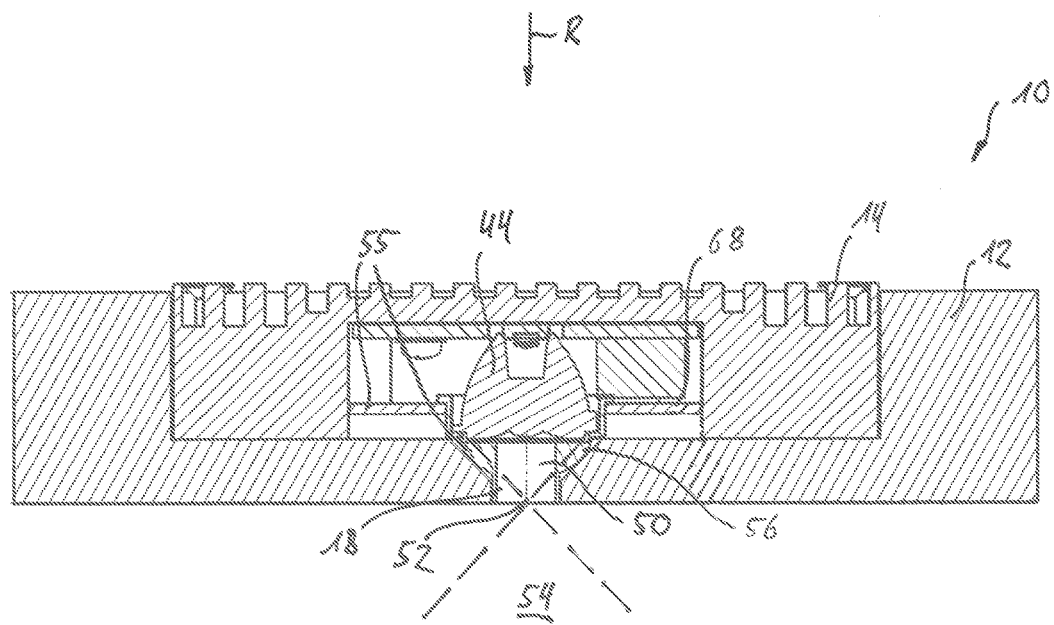
Figure 6C:
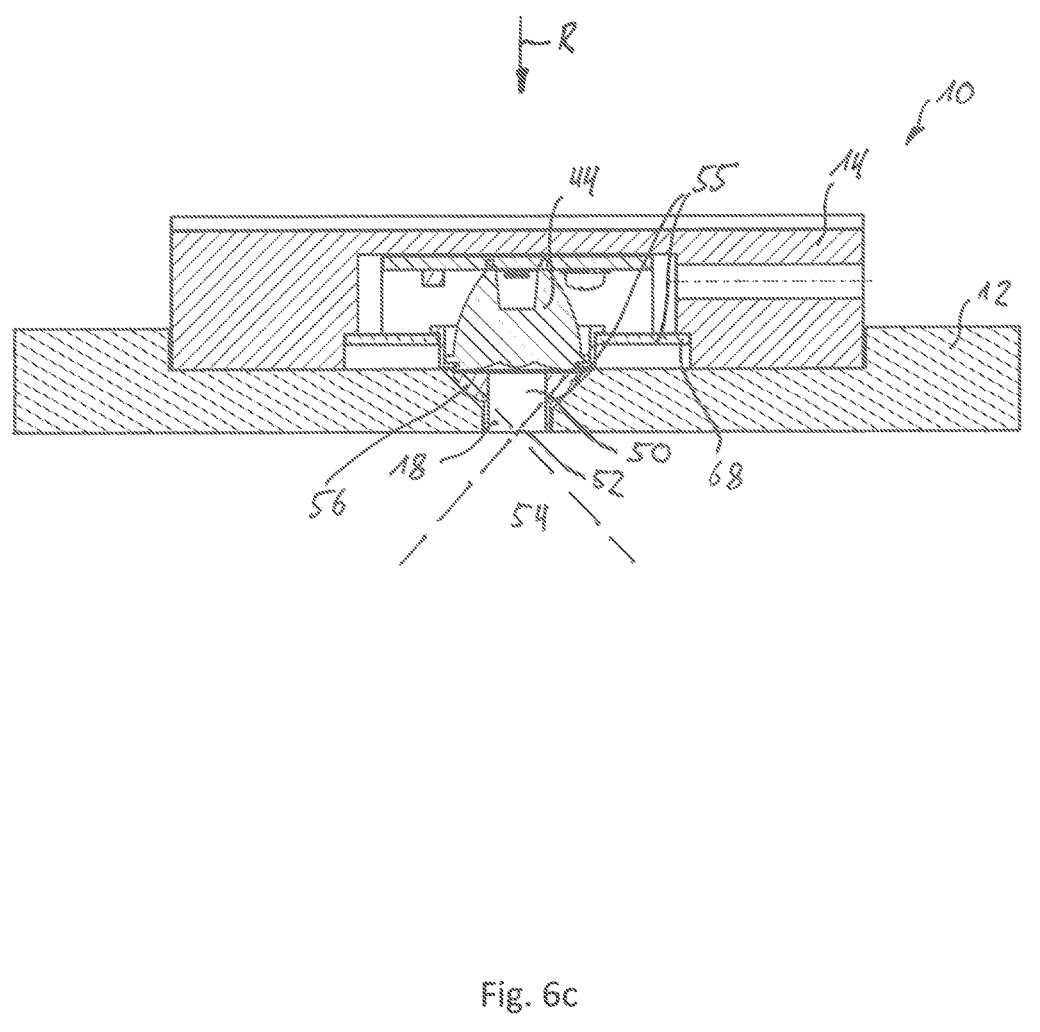

In FIG. 6b and FIG. 6c, the thickness of the wall or ceiling element 12 is large than the protrusion of the support element 56 over the holding plate 68 or rather over the front side of the housing 28. In order to achieve a flush closure of the support element 56 with the front side 20 of the wall or ceiling element, a recess 86 is provided on the rear side 16 of the wall or ceiling element that extends in the longitudinal direction R into the wall or ceiling element and comprises a suitable shape for the accommodation of the lighting device 14. The depth of the recess 86 is chosen such that the remaining thickness of the wall or ceiling element 12 corresponds to the protrusion of the support element 56 over the holding plate 68 or rather over the front side of the housing 28, or rather that the lighting device lying flat on the floor of the recess 86 is positioned such that the support element 56 or rather the holding device 55 closes flush with the front side 20 of the wall or ceiling element 12. The focal point 52 is situated in the first light passage opening 18 or rather in the plane of the front side 20 of the wall or ceiling element respectively.

Figure 6D:
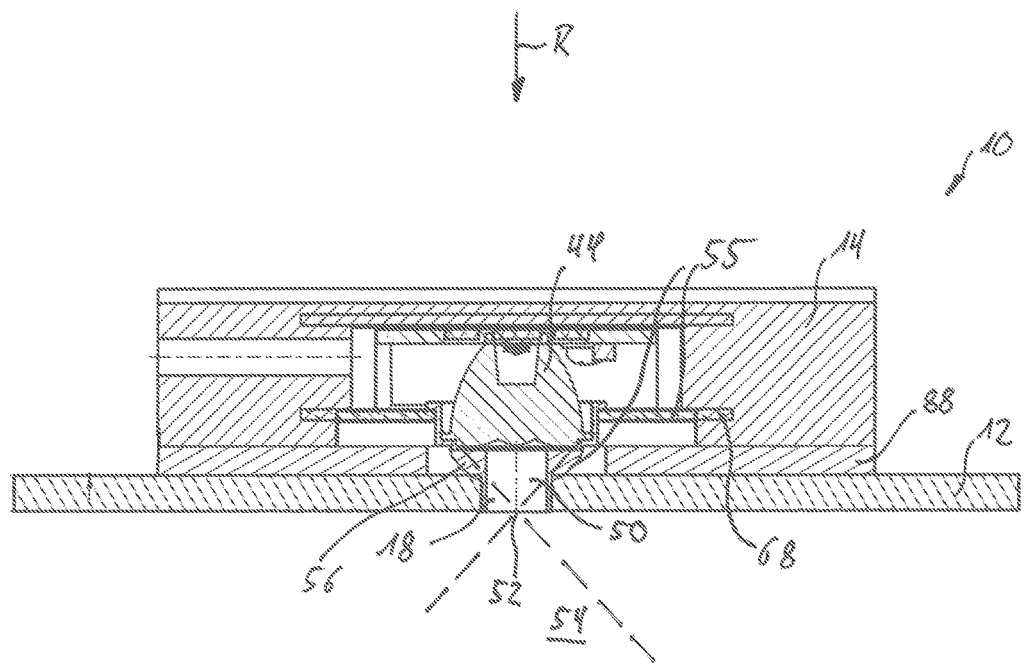
Figure 6E:
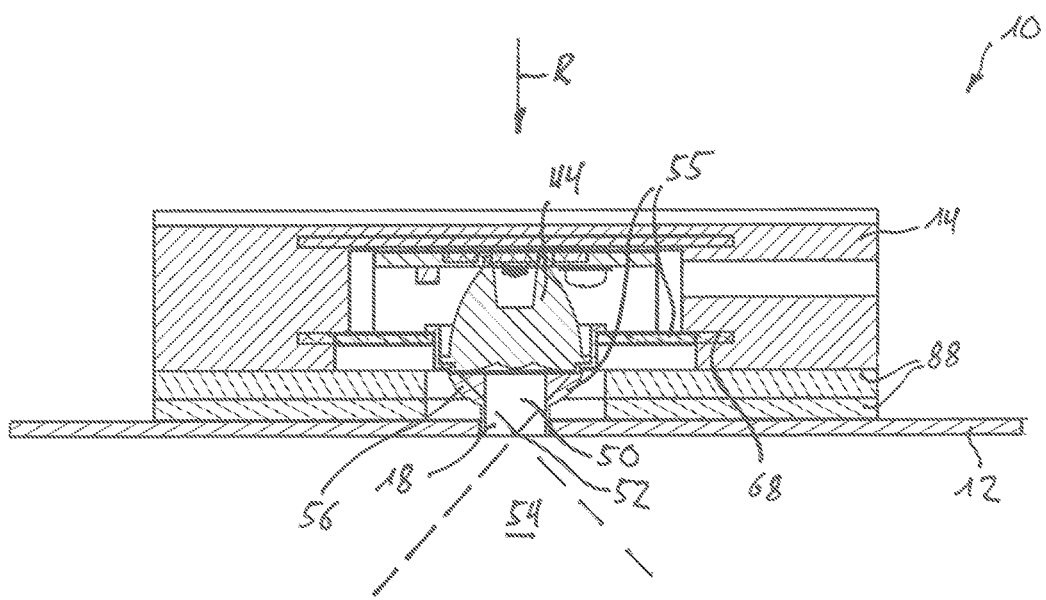
Figure 7:
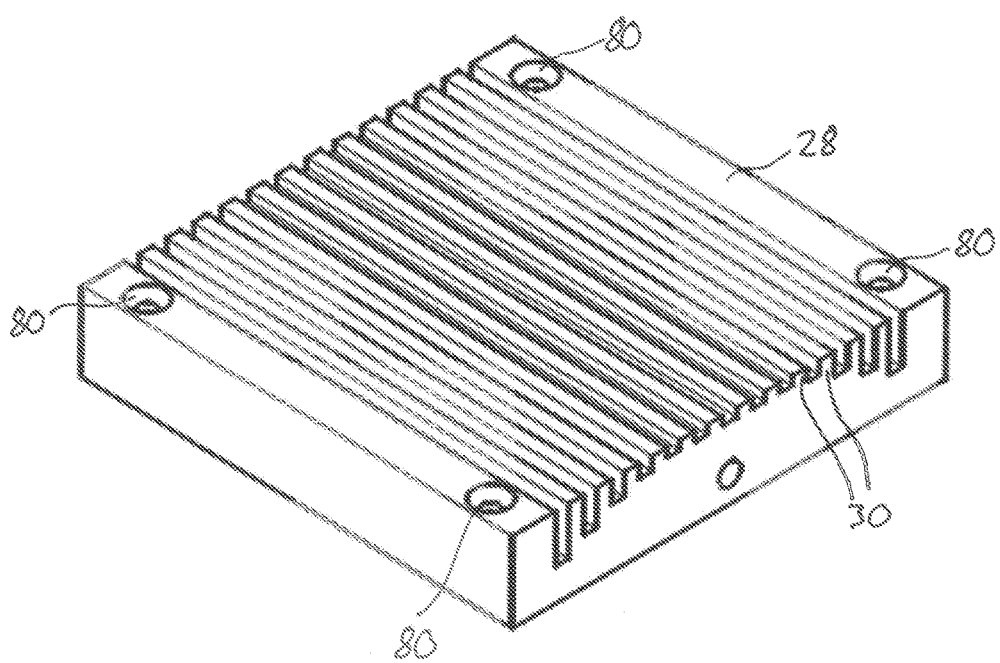
FIG. 7 shows a perspective view of a third embodiment of a lighting device.
Figure 8:
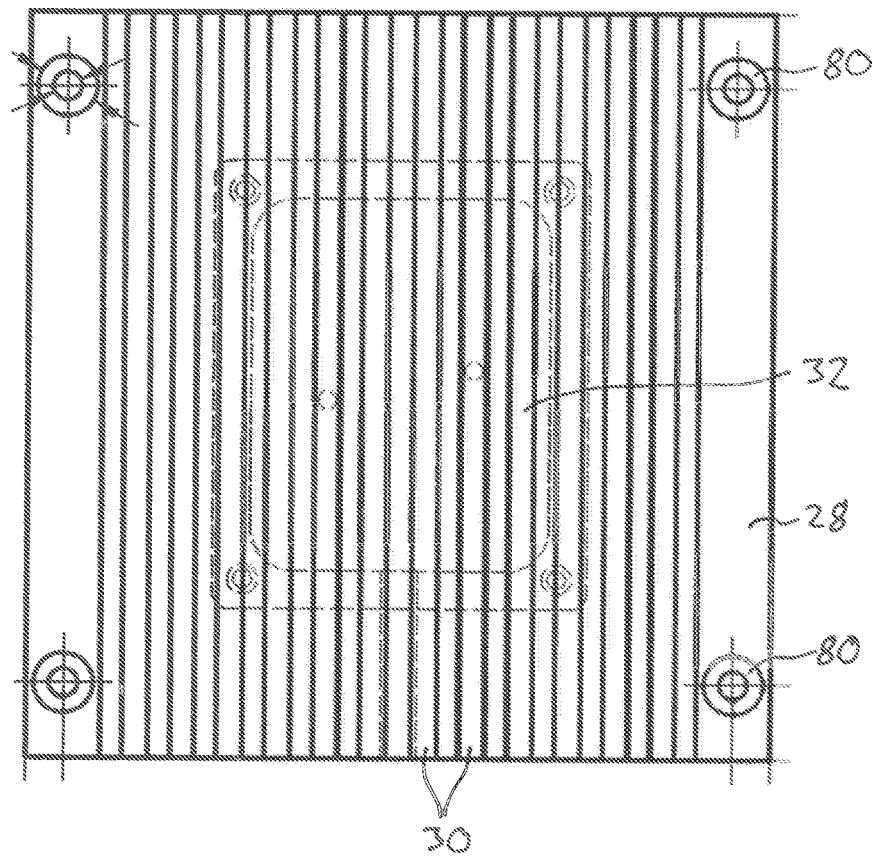
FIG. 8 shows a rear view of the lighting device of FIG. 7.
Figure 9:
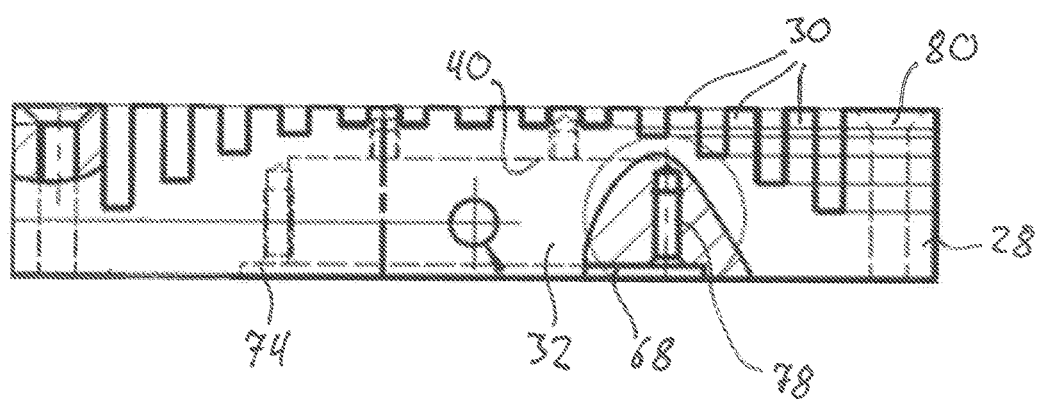
FIG. 9 shows a first sectional side view through the housing of the lighting device of FIG. 7.
Figure 10:
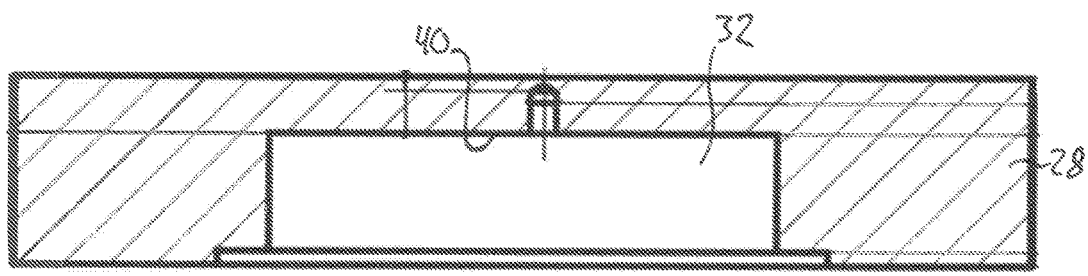
FIG. 10 shows a second sectional side view through the housing of the lighting device of FIG. 7.
Figure 11:
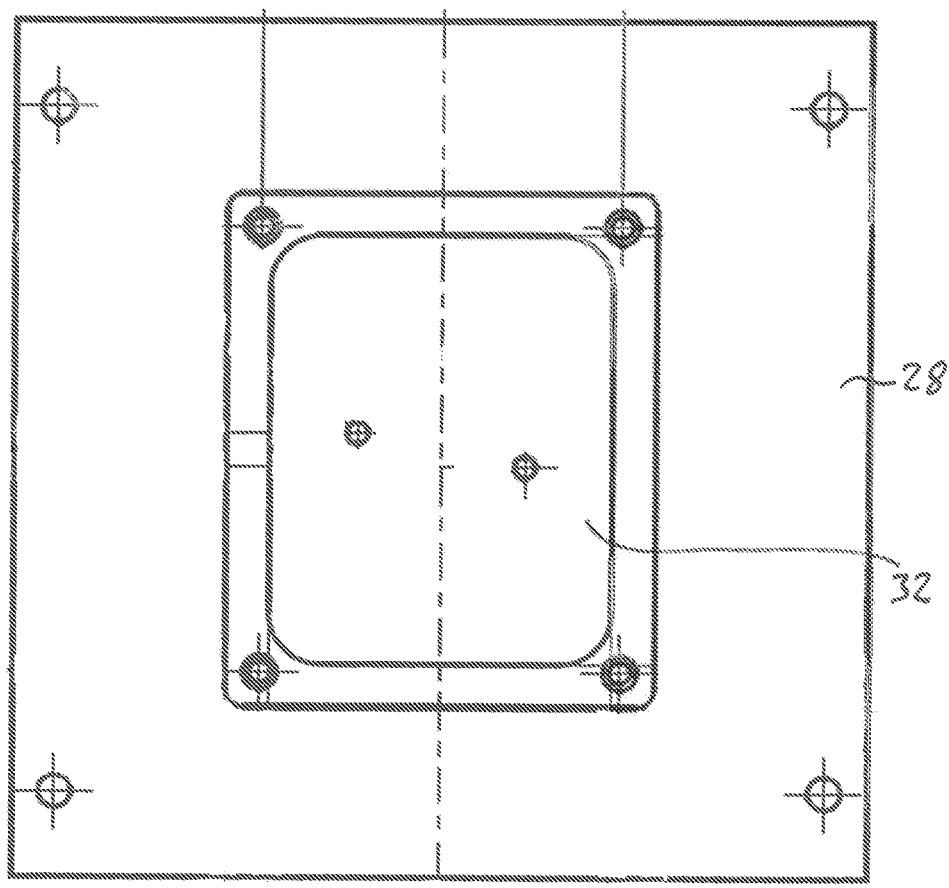
FIG. 11 shows a plan view onto the front side of the lighting device of FIG. 7.
Figure 12:
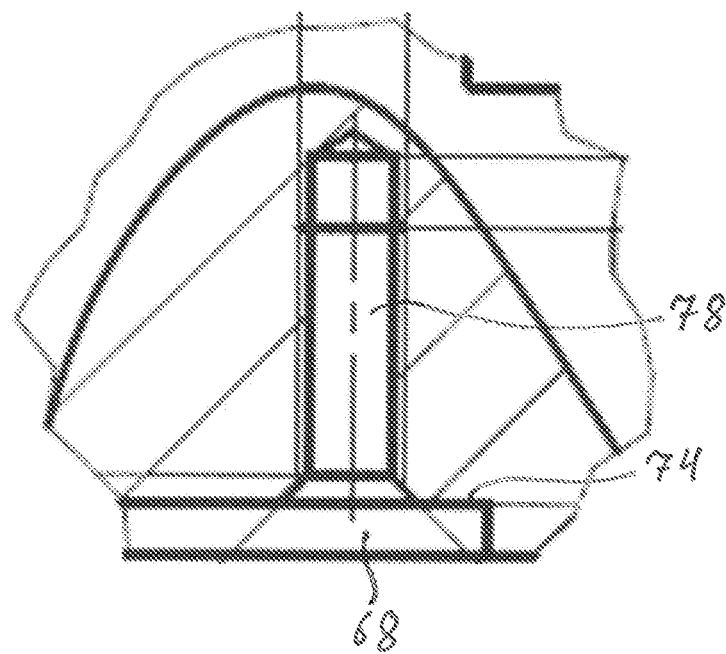
FIG. 12 shows a partial detailed view of the sectional view of FIG. 9.

In FIG. 6d and FIG. 6e the thickness of the wall or ceiling element 12 is smaller than the protrusion of the support element 56 over the holding plate 68 or rather over the front side of the housing 28. In order to achieve a flush closure of the support element 56 with the front side 20 of the wall or ceiling element, a spacing element 88 (FIG. 6e) or rather two spacing elements 88 (FIG. 6e) are provided, through which the spacing between the lighting device 14 and the rear side 16 of the wall or ceiling element 12 can be varied in such a way that the support element 56 or rather the holding device 55 closes flush with the front side 20 of the wall or ceiling element 12. The spacing elements 88 comprise each in plan view in the longitudinal direction R essentially the same shape as the lighting device 14. For example, the spacing elements 88 are fixed to the wall or ceiling element 12 before installation of the lighting device 14. In particular, a multitude of spacing elements 88 may be used, in order to achieve an adjustment of the position of the lighting device 14 to a thickness of a wall or ceiling element 12. The spacing elements 88 may comprise different thicknesses or each the same thickness.

In FIG. 7 to FIG. 12 a housing 28 for a third embodiment for a lighting device 14 is shown. The construction of this housing corresponds in principle to the housing of the lighting devices 14 shown in FIG. 1 to FIG. 5.

The housing differentiates itself in the shape of the cooling fins 30. The height of the cooling fins 30 decreases towards the region of the accommodation space 32, so that the floors of the gaps 84 formed between the cooling fins 30 lie on a curved surface.

Furthermore the edge of the accommodation space 32 comprises no recesses 76. The holding plate comprises correspondingly also no protrusions 70. The position of the holding plate 68 is determined in that the accommodation space 32 comprises a rectangular form, so that the holding plate 68 may only be attached to the housing in one orientation.

Figure 13:
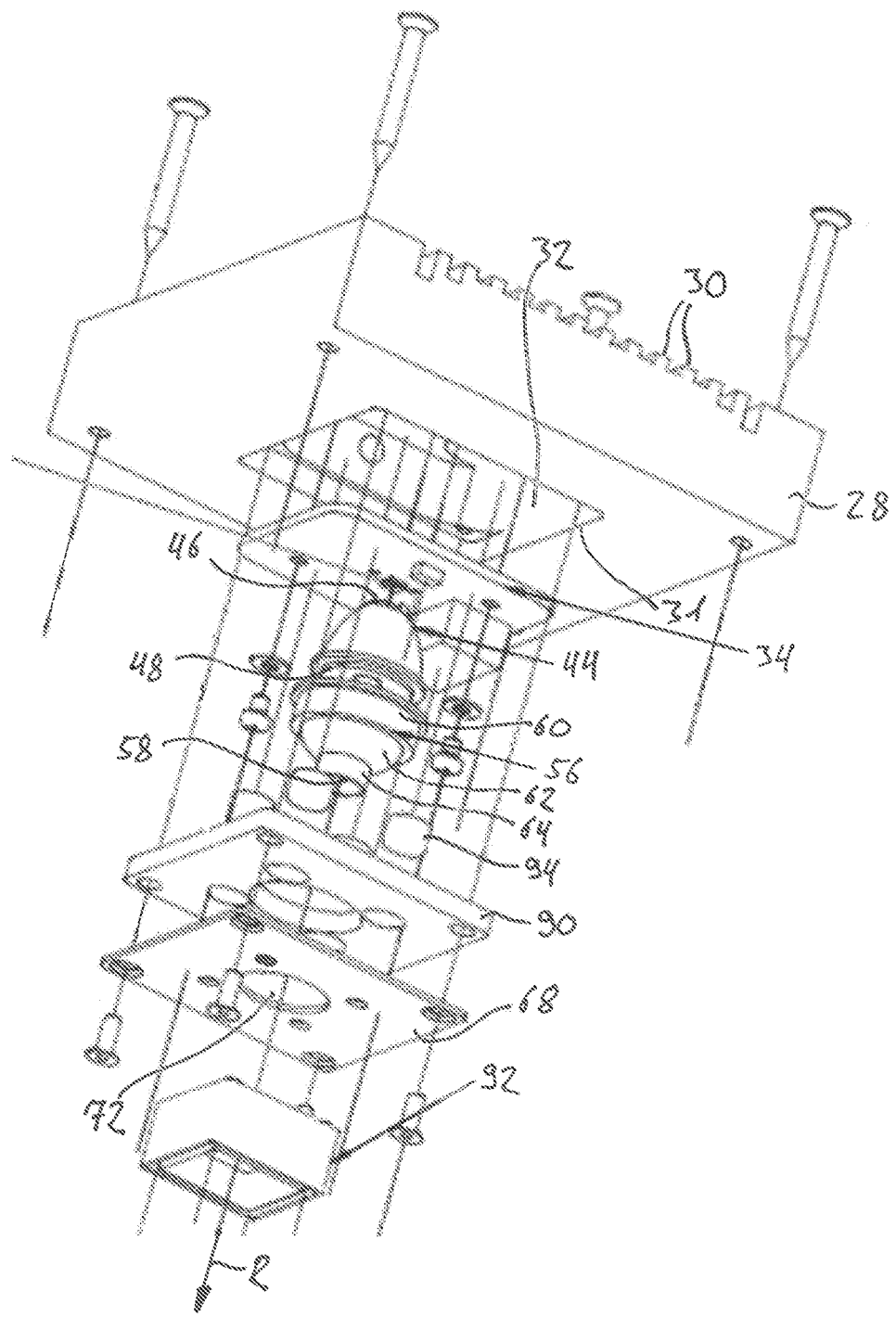
FIG. 13 shows an exploded view of a fourth embodiment of a lighting device.
Figure 14:
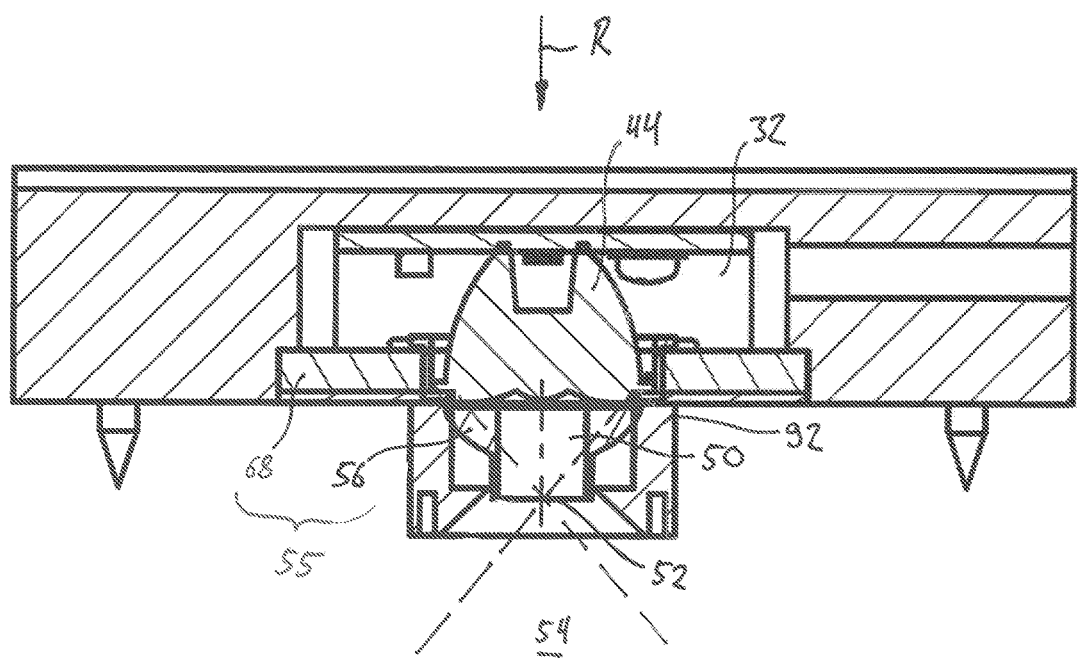
FIG. 14 shows a sectional side view through the lighting device of FIG. 13.

In the embodiment show in FIG. 13 and FIG. 14 the holding device 55 comprises a distancing element 90, which is provided in the longitudinal direction R before the holding plate 68 and defines the spacing of the holding plate to the installation surface and thereby the spacing of the lens arrangement 44 from the light source. The spacing can be chosen such that the focal point 52 is situated at a desired distance from the light source 36 or rather the lighting device 14. In this way, an adjustment of the focal point to different thicknesses of the wall of ceiling element 12 is possible, for example.

In addition, an anti-glare frame 92 is provided, which is provided in the longitudinal direction R behind the holding plate 68 and is held thereon. In the distancing element 90, magnets 94 are provided, which hold the anti-glare frame 92 made from a magnetic material on the holding plate 68. The anti-glare frame 92 forms a glare shield, which screens unwanted dispersed light so that the lighting device 14 comprises a defined light emission character. The glare shield is additionally formed through also through the support element 56.

In FIG. 15 and FIG. 16a to FIG. 16e, a further embodiment of a lighting device 14 is shown, which is distinguished from the embodiments shown in FIG. 13 and FIG. 14 solely in that the contact surface 61 is provided on the holding plate 68, i.e. the lens arrangement 44 is support or rather borne by the holding plate 68, i.e. the holding device 55 is solely formed from the holding plate 68 and the distancing element 90.

Figure 15:
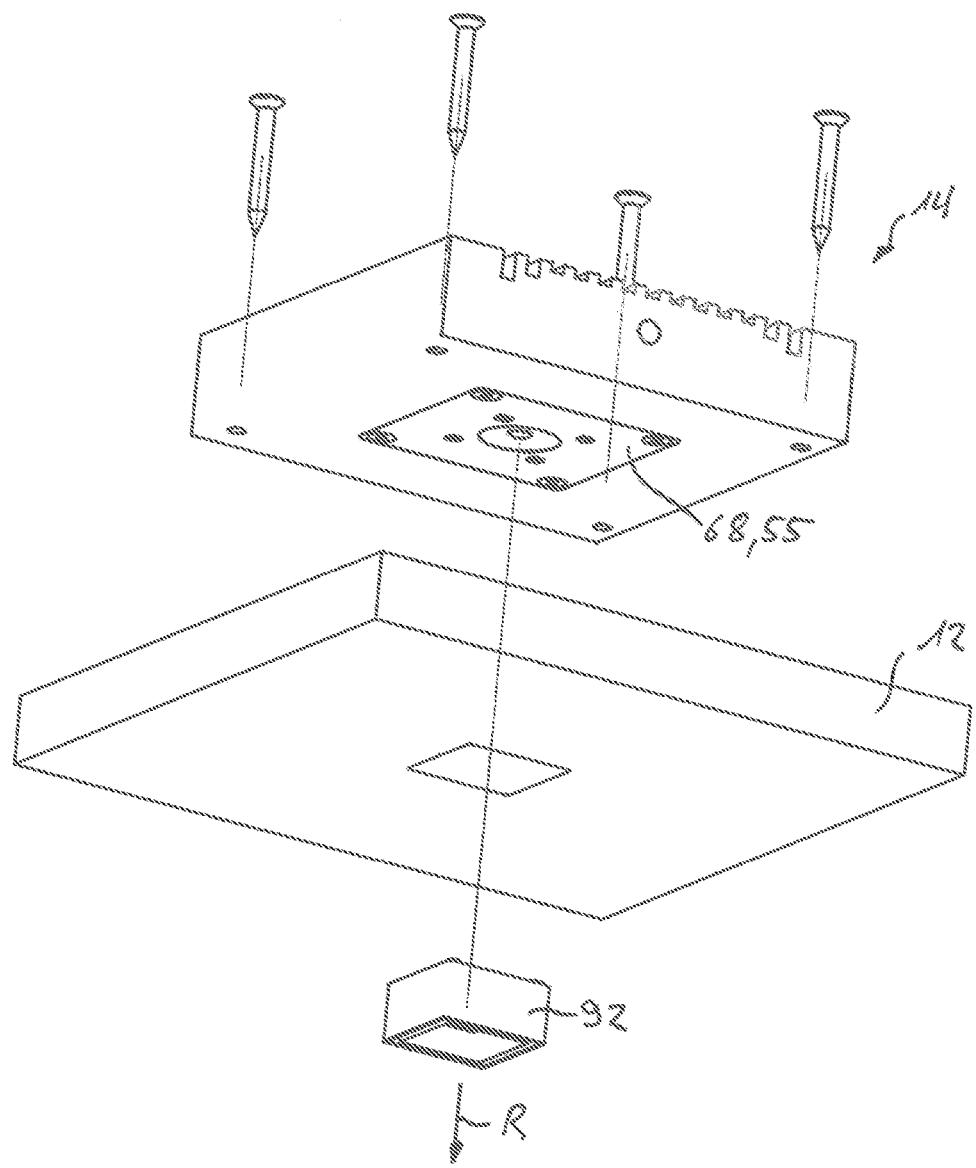
FIG. 15 is an exploded view of a lighting assembly with a fifth embodiment of a lighting device.
Figure 16A:
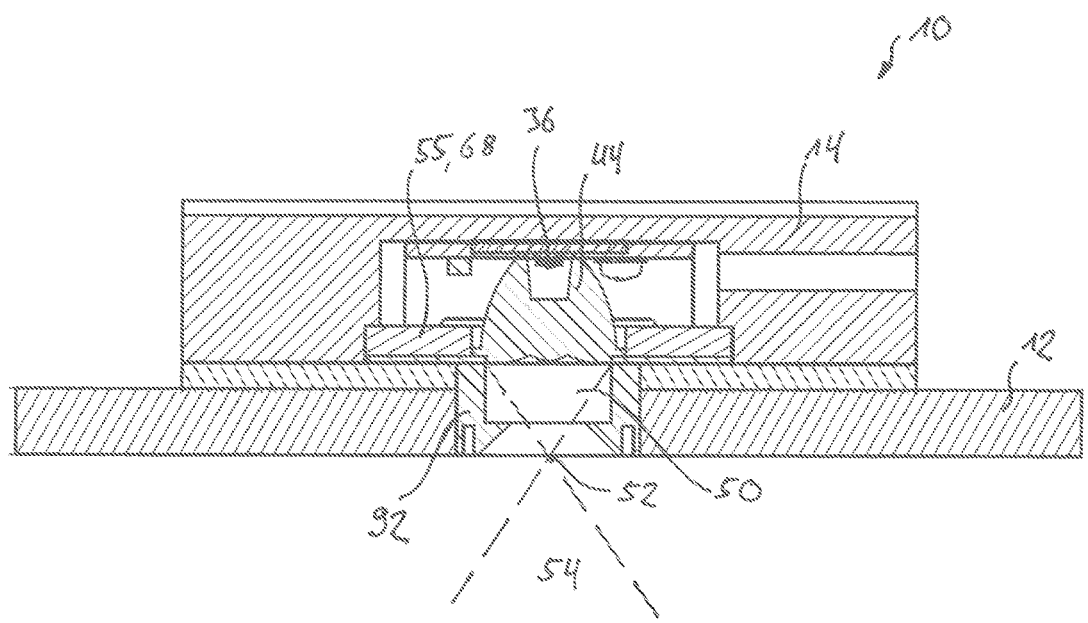
FIG. 16a to FIG. 16e show various embodiments of the lighting assembly of FIG. 15.
Figure 16B:
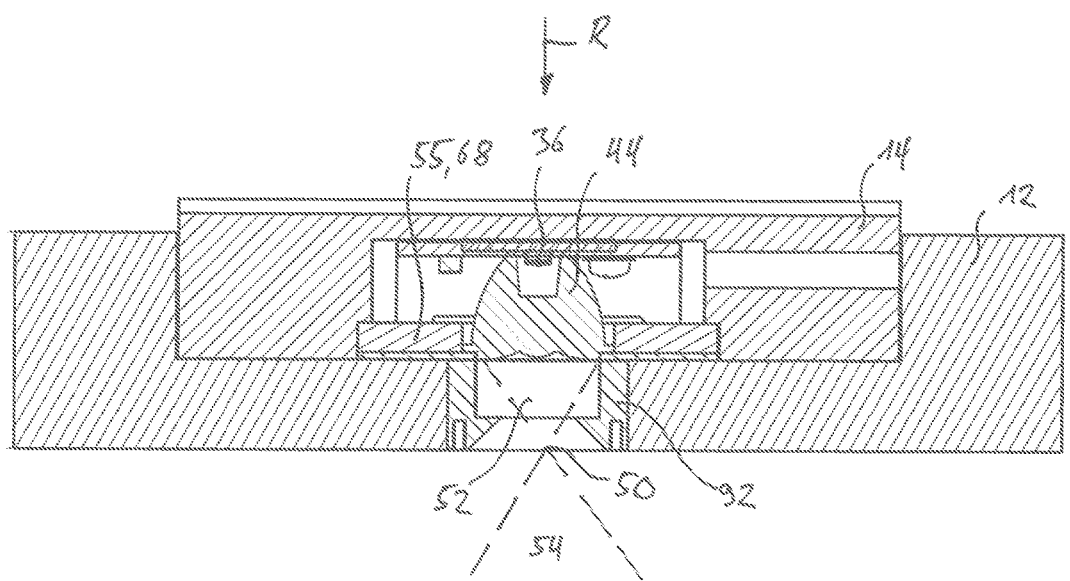
Figure 16C:
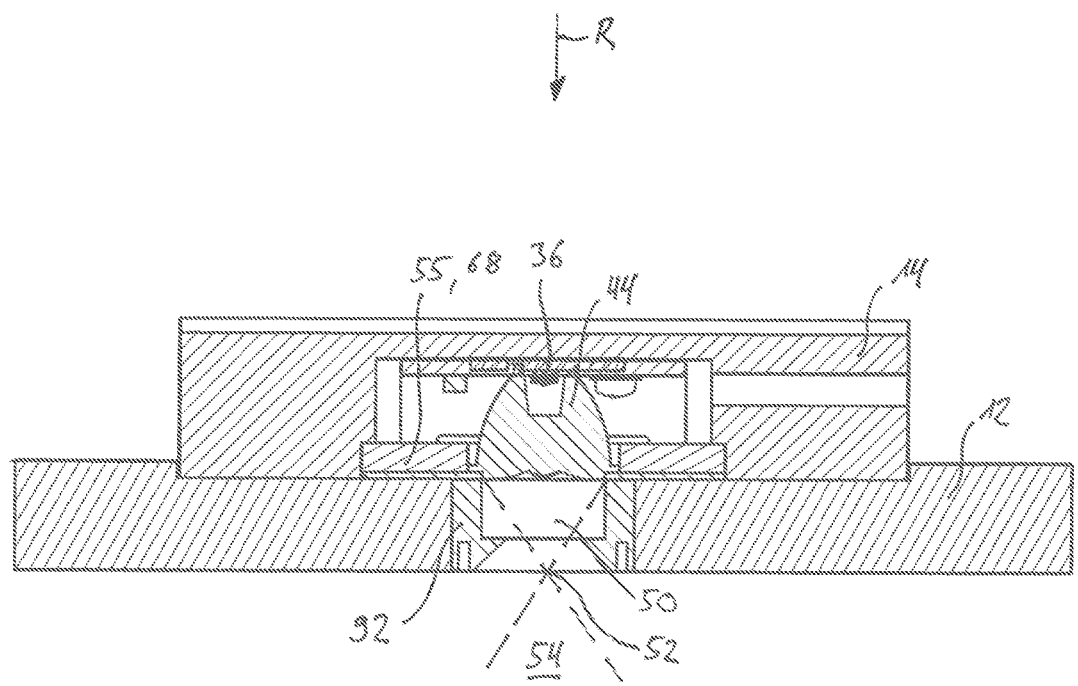
Figure 16D:
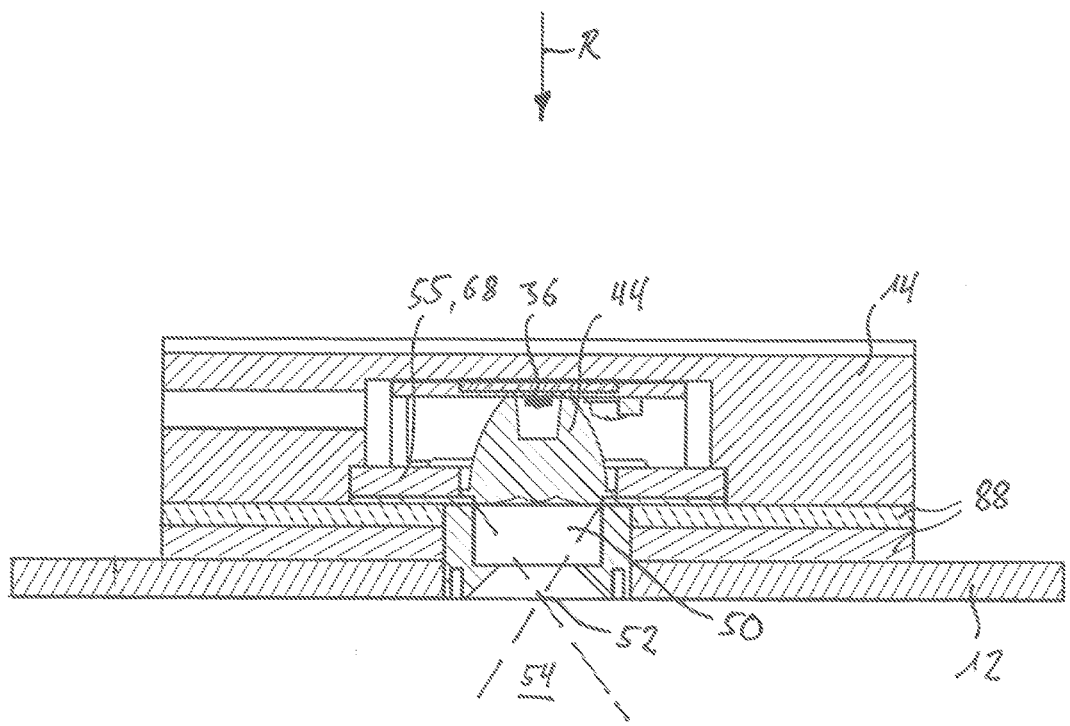
Figure 16E:
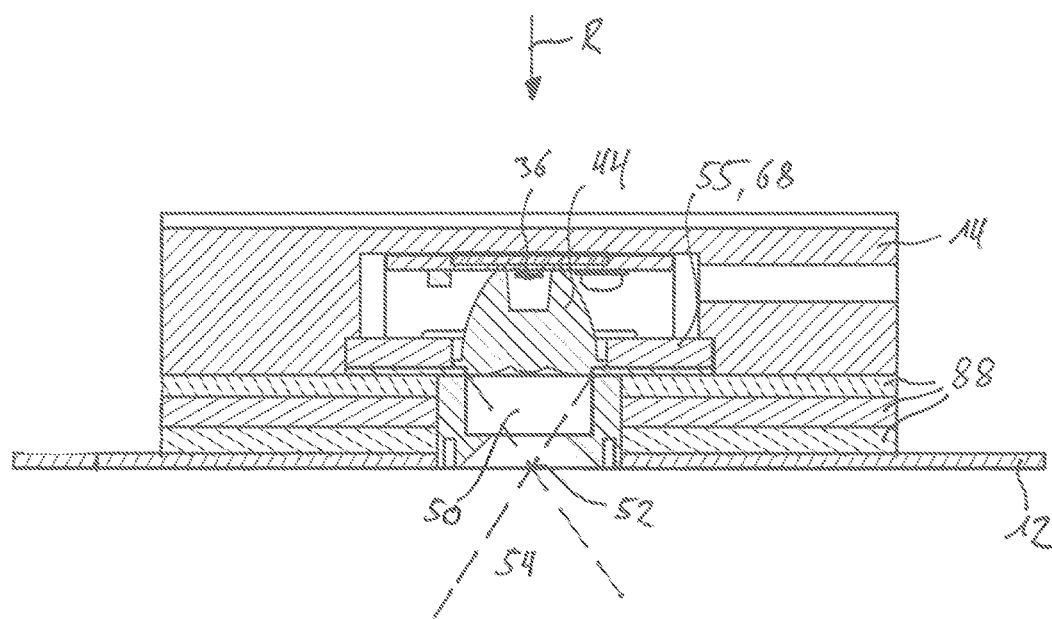

FIG. 16a to FIG. 16e show analogously to FIG. 6a to FIG. 6e the installation of the lighting device 14 from FIG. 15 with various thicknesses of the wall or ceiling element 12.

For example, an optical element can be provided in the support element 56 or in the anti-glare frame, which partially screens or disperses the light. Optionally, a cover element that allows light to pass through it may be provided, that closes the second light passage opening 58 to the front side 20 of the wall or ceiling element 12, so that the second light passage opening 58 is protected from dirt, dust or water splashes.

Exchange of the lighting device 14 in the case of a built-in wall or ceiling element 12 is possible through a complete disassembly of the wall or ceiling element 12. Alternatively, the segment of the wall of ceiling element 12 on which the lighting device 14 is fixed may be separated along the weak zones 26.

Preferably, the position of the weak zones 26 is known, so that these may be additionally weakened for detachment of the lighting device 14, for example through cutting into the front side 20 of the wall or ceiling element 12 with a knife or a saw in the region of the weak zones 26. In particular, the wall or ceiling element 12 can be completely separated at the weak zones 26, so that a simple removal of the segment with the lighting device 14 may occur.

It is only necessary, that the hosing 28 comprises an accommodation space 32 for accommodation of the light source 36, the lens arrangement 44 as well as the support element 56 and that a holding plate fixes these elements in the accommodation space.

What is claimed is:

1. A lighting device comprising:
   a housing defining a first light passage opening and an accommodation space, wherein the accommodation space comprises an accommodation opening and an installation surface disposed in front of the accommodation opening in a longitudinal direction,
   a light source disposed in the accommodation space on the installation surface;
   a holding device extending entirely over the accommodation opening and defining a second light passage opening;
   a lens arrangement disposed in the accommodation space and mounted on the holding device, the lens arrangement comprising a light entry side facing the light source and a light exit side facing away from the light source, and which focuses light emitted from the light source in a longitudinal direction extending from the light entry side to the light exit side to a light cone whose focal point lies in the longitudinal direction behind the light exit side of the lens arrangement.

2. The lighting device of claim 1 wherein the holding device comprises an accommodation for the light exit side of the lens arrangement with a contact surface for the lens arrangement facing contrary to the longitudinal direction, wherein the lens arrangement comprises at least one protrusion and/or a surrounding edge lie in on the contact surface.

3. The lighting device of claim 1 including at least one elevation or protrusion for contact with the holding device on an edge of the accommodation space.

4. The lighting device of claim 1 wherein the holding device comprises at least one distancing element which determines the separation between the light source, the holding device and the lens arrangement.

5. The lighting device of claim 1 including a glare shield with a light exit channel extending in the longitudinal direction before the lens arrangement.

6. The lighting device of claim 5 wherein the glare shield comprises an anti-glare frame arranged in the longitudinal direction behind the lens arrangement.

7. The lighting device of claim 5 wherein the glare shield comprises a support element which is part of the holding device and in which the second light passage opening is defined, and the support element supports and/or carries the lens arrangement.

8. The lighting device of claim 7 wherein the holding device comprises a holding plate fixed on the housing and comprises a recess on which the support element is held or fixed.

9. The lighting device of claim 7 wherein the support element comprises at least one section with a constant cross section joining to the light exit opening in the longitudinal direction and a section with tapering cross section which joins to the section with constant cross section on the side facing away from the lens arrangement.

10. The lighting device of claim 5 wherein the focal point is arranged in the plane of the rear end of the glare shield in the longitudinal direction.

11. The lighting device of claim 6 wherein at least one optical element is arranged in the light exit channel.

12. The lighting device of claim 1 wherein the housing is a cooling body comprising cooling fins opposite the accommodation space.

13. The lighting device of claim 1 including a spacing plate protruding in the longitudinal direction on the side of the housing comprising the accommodation opening.

14. The lighting assembly of claim 1 having a flat wall or ceiling element, whereby the wall or ceiling element comprises a first light passage opening, and the lighting device is arranged on a rear side of the wall or ceiling element such that the focal point is located in the first light passage opening and/or in the plane of a front side of the wall or ceiling element opposite the rear side, wherein the lighting device contacts the rear side of the wall or ceiling element flatly.

15. The lighting assembly of claim 14 including a spacing plate between the housing and the wall or ceiling element having a thickness such that the focal point is located in the plane of the front side of the wall or ceiling element.

16. The lighting assembly of claim 14 wherein the wall or ceiling element comprises a weak zone surrounding the lighting device in a circumferential direction at least in sections and extends into the wall or ceiling element from the rear side facing the lighting device.

* * * * *